Figure 9:
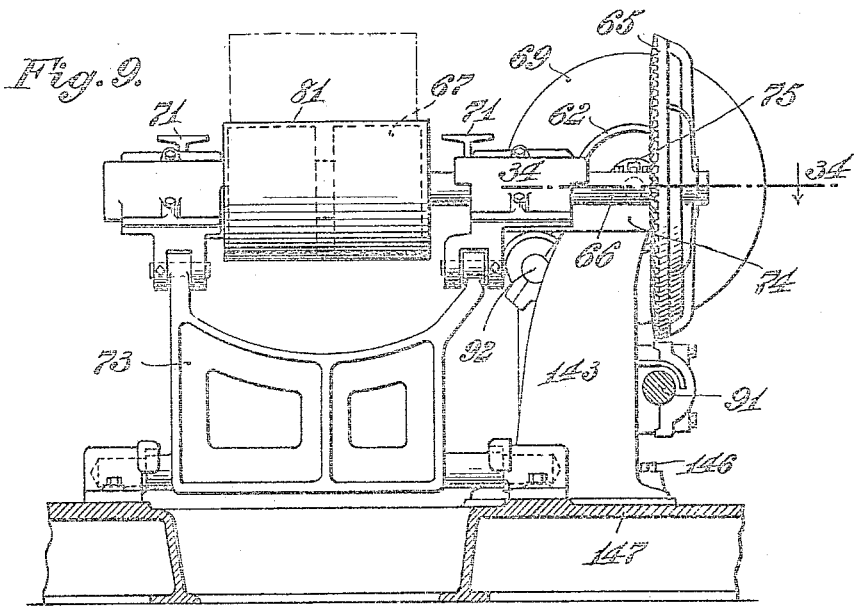

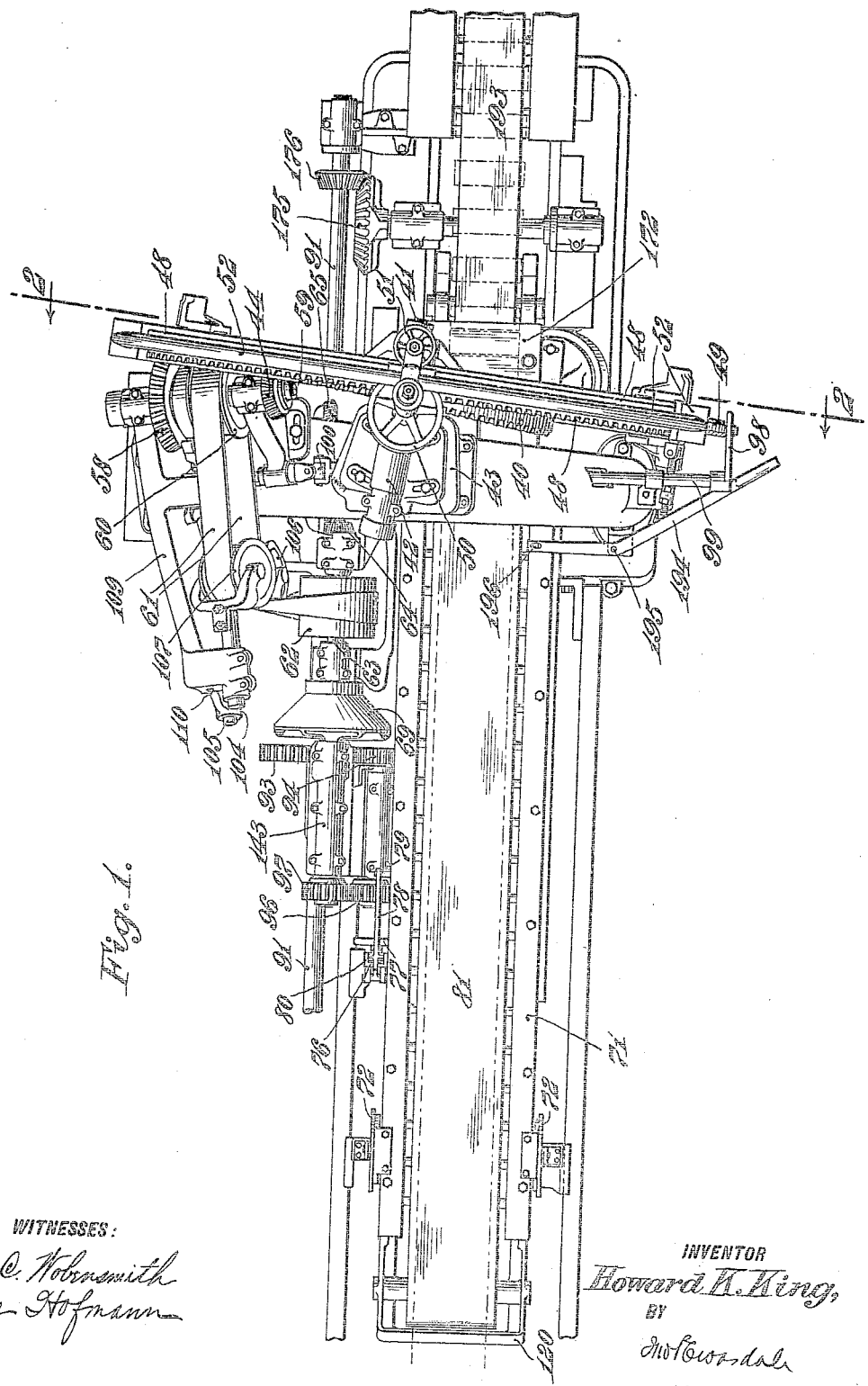

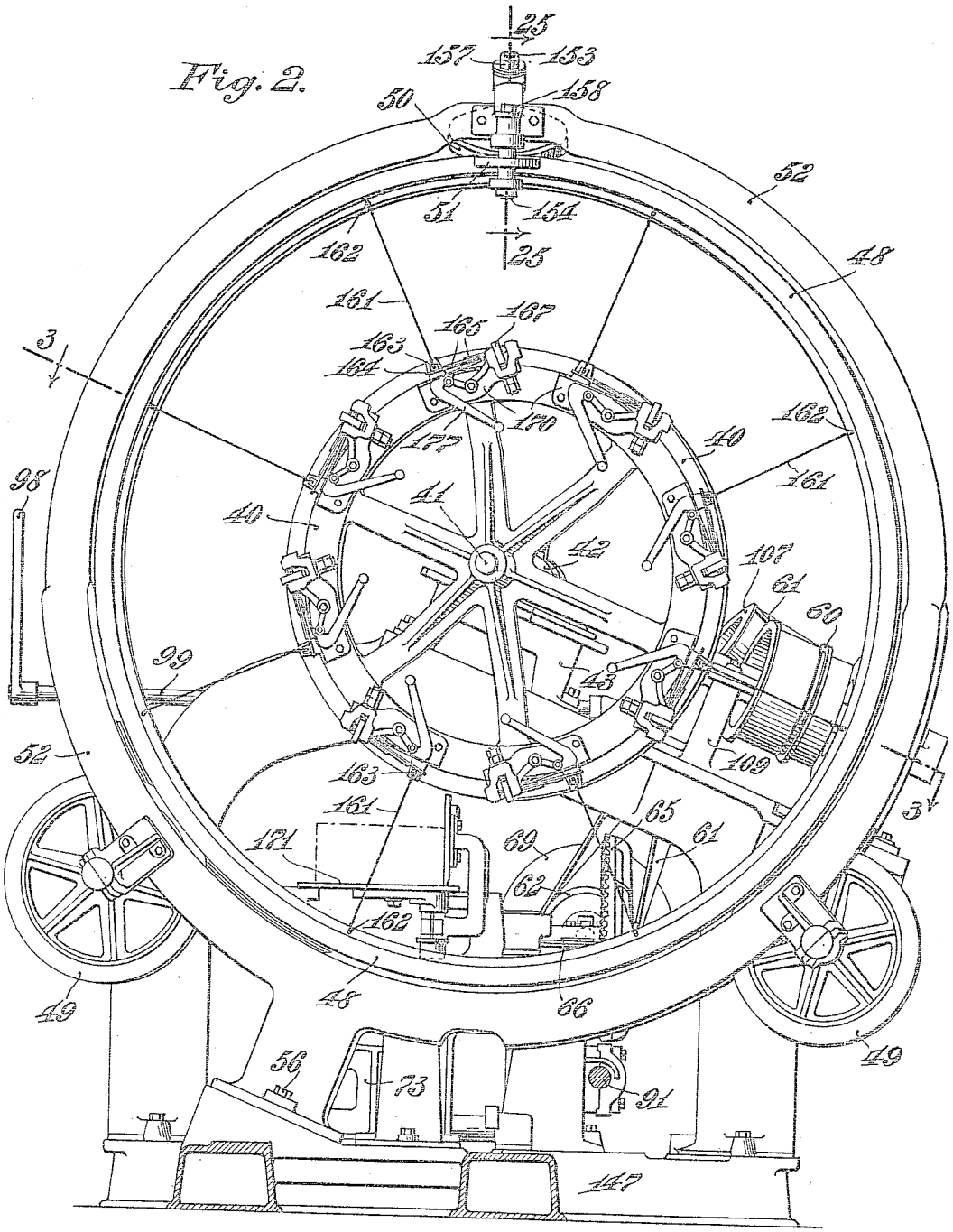

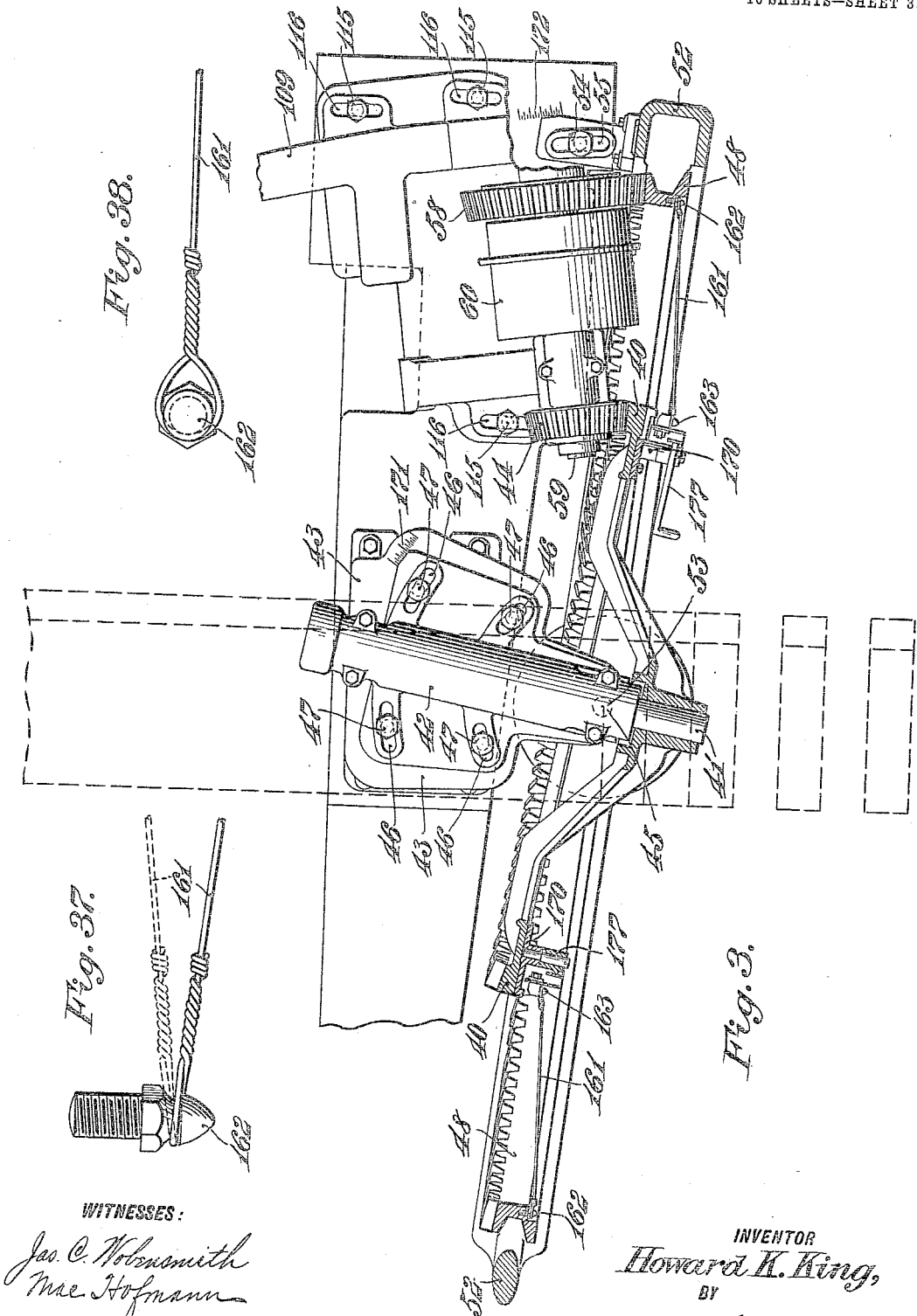

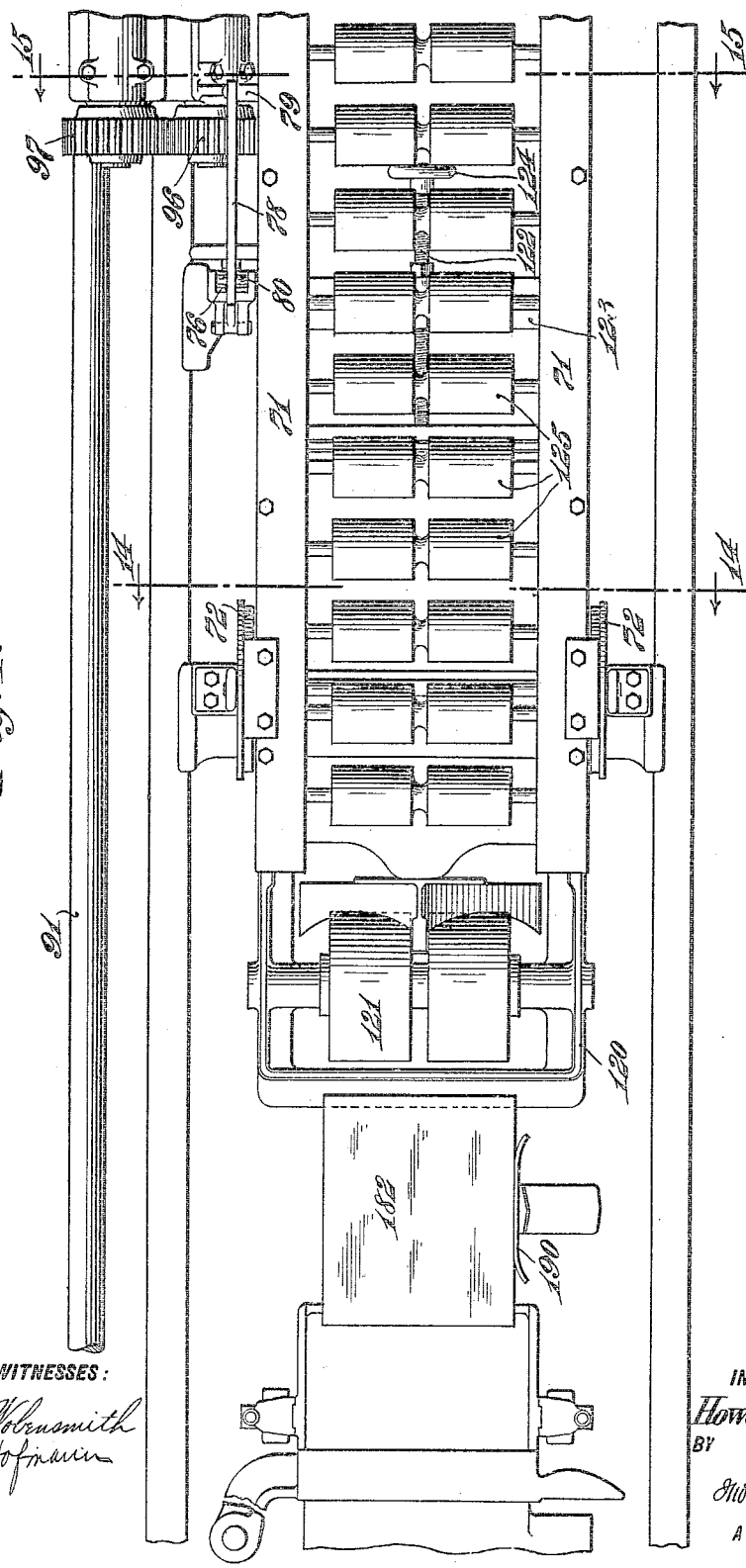

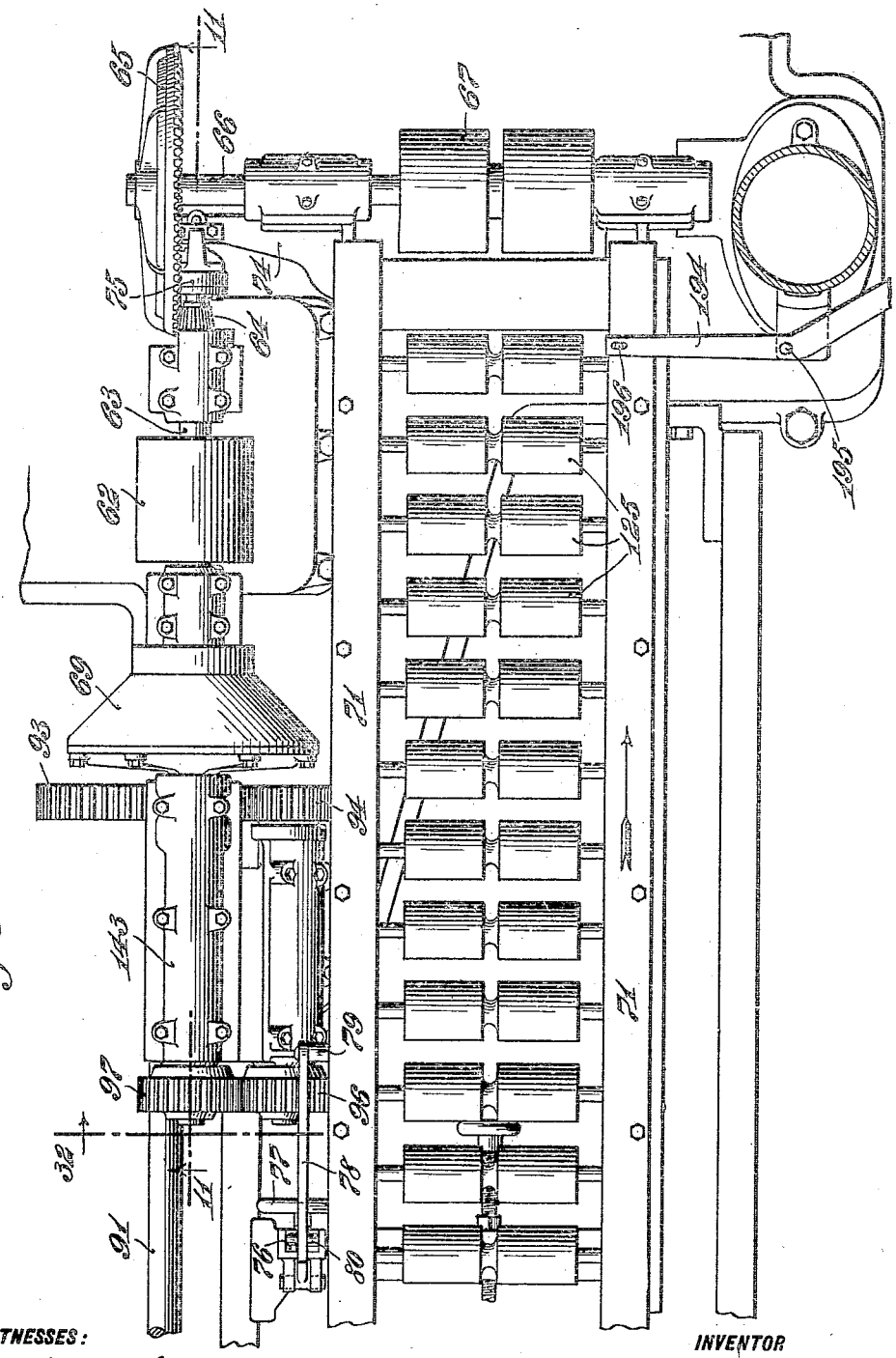

H. K. KING.
BRICK MACHINE.
APPLICATION FILED DEC. 5, 1907.
953,670.
Patented Mar. 29, 1910.
16 SHEETS—SHEET 6.
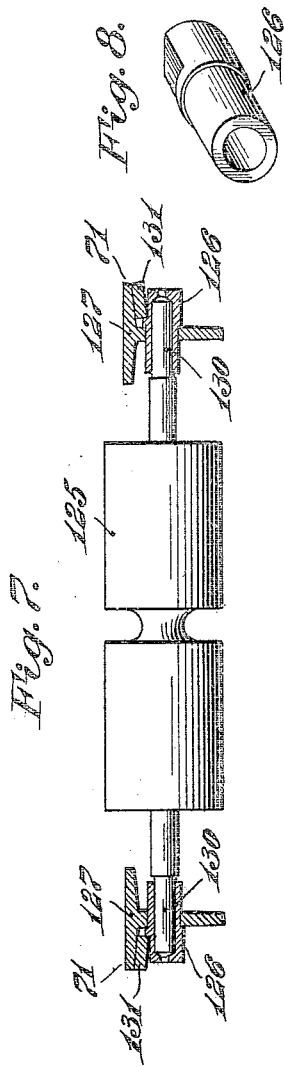
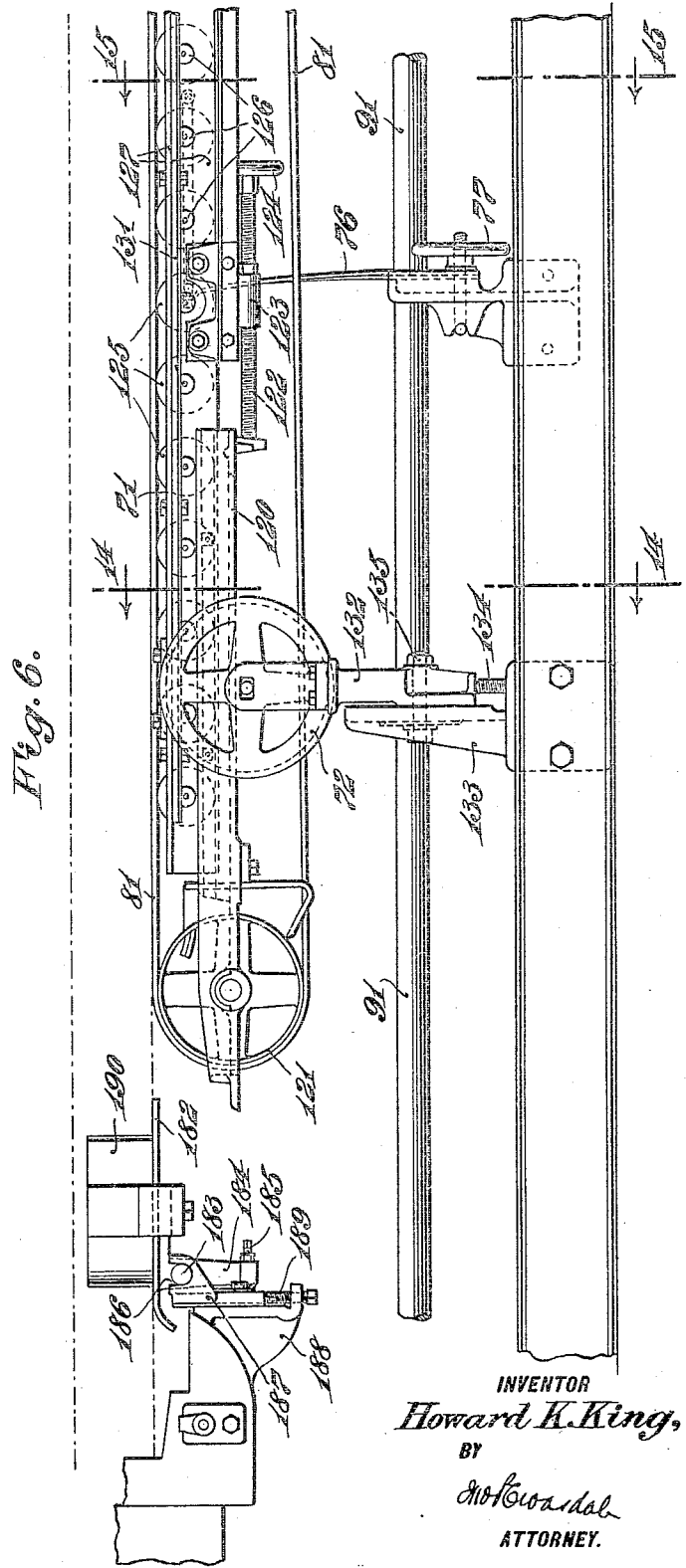
WITNESSES:
Jas. C. Wobensmith
Moe Hofmann
INVENTOR
Howard K. King,
BY
H. K. Croasdale
ATTORNEY.

H. K. KING.
BRICK MACHINE.
APPLICATION FILED DEC. 5, 1907.

953,670.

Patented Mar. 29, 1910.
16 SHEETS—SHEET 7.

WITNESSES:
Jas. C. Wolrensmith
Mae Hofmann

INVENTOR
Howard K. King,
BY
[signature]
ATTORNEY.

H. K. KING.
BRICK MACHINE.
APPLICATION FILED DEC. 5, 1907.

953,670.

Patented Mar. 29, 1910.
16 SHEETS—SHEET 8.

WITNESSES:
Jas. C. Wobensmith
Mae Hofmann

INVENTOR
Howard K. King,
BY
H. H. Coasdale
ATTORNEY.

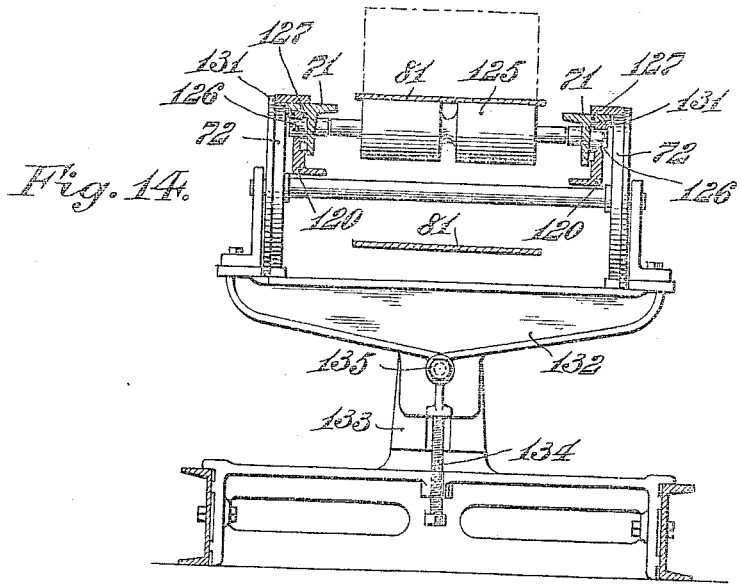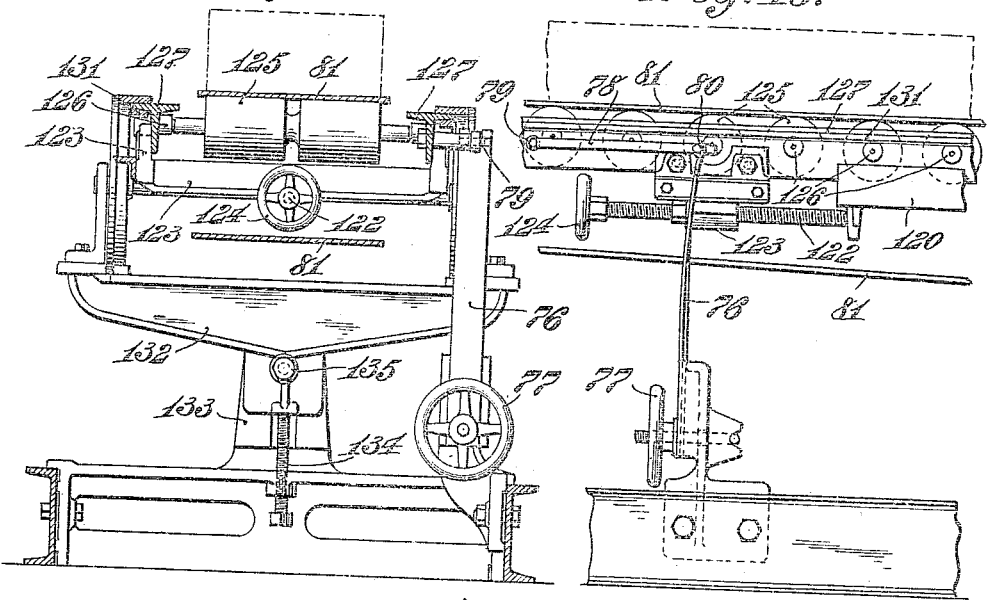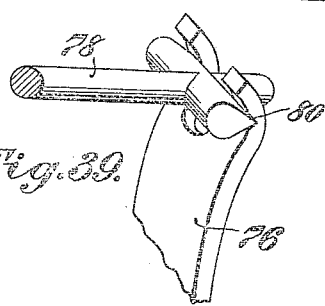

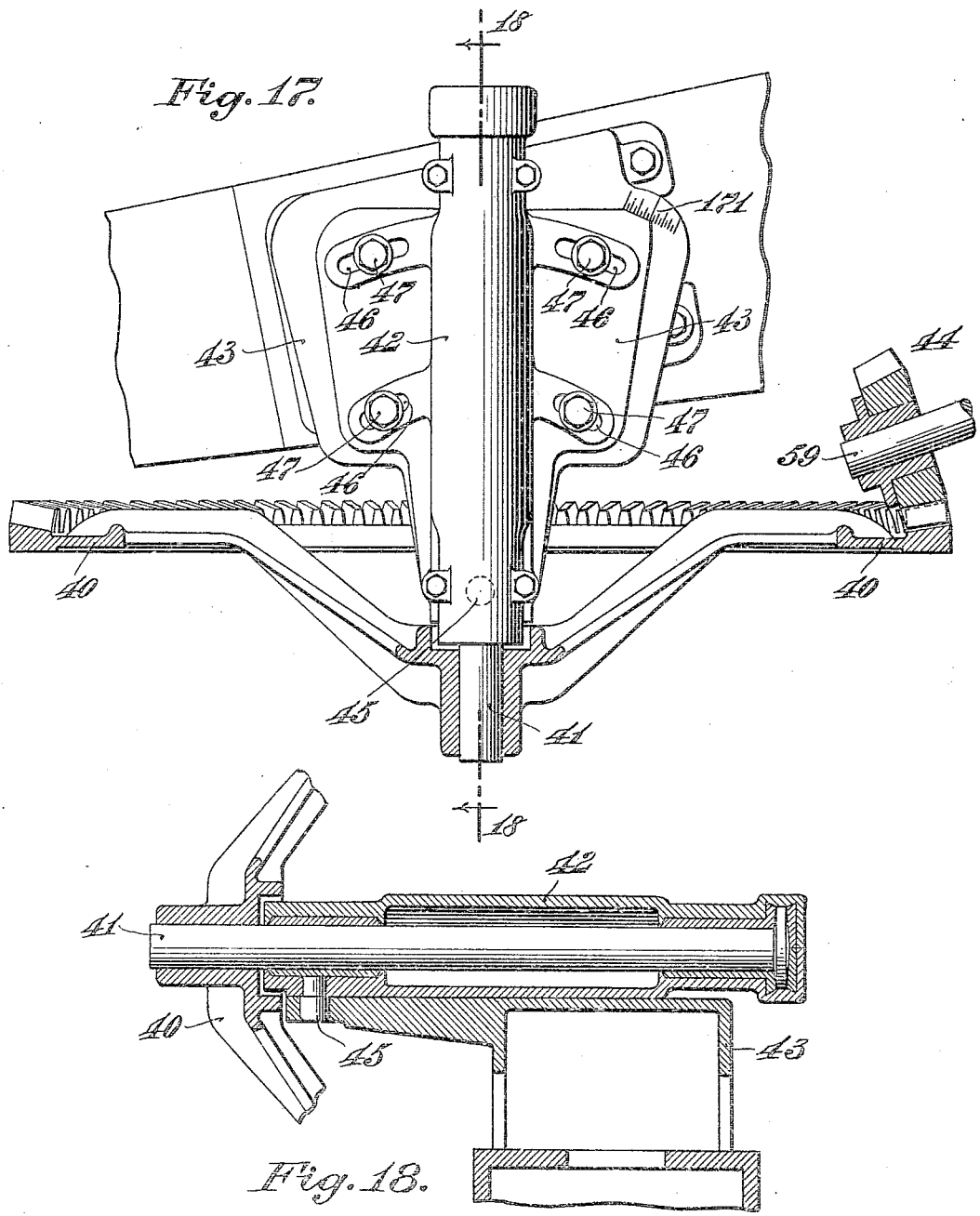

H. K. KING.
BRICK MACHINE.
APPLICATION FILED DEC. 5, 1907.

953,670.

Patented Mar. 29, 1910.
16 SHEETS—SHEET 11.

WITNESSES:
Jas. C. Wobensmith
Mae Hofmann

INVENTOR
Howard K. King,
BY
Thos. Cowasdal
ATTORNEY.

H. K. KING.
BRICK MACHINE.
APPLICATION FILED DEC. 5, 1907.
953,670.
Patented Mar. 29, 1910.
16 SHEETS—SHEET 12.
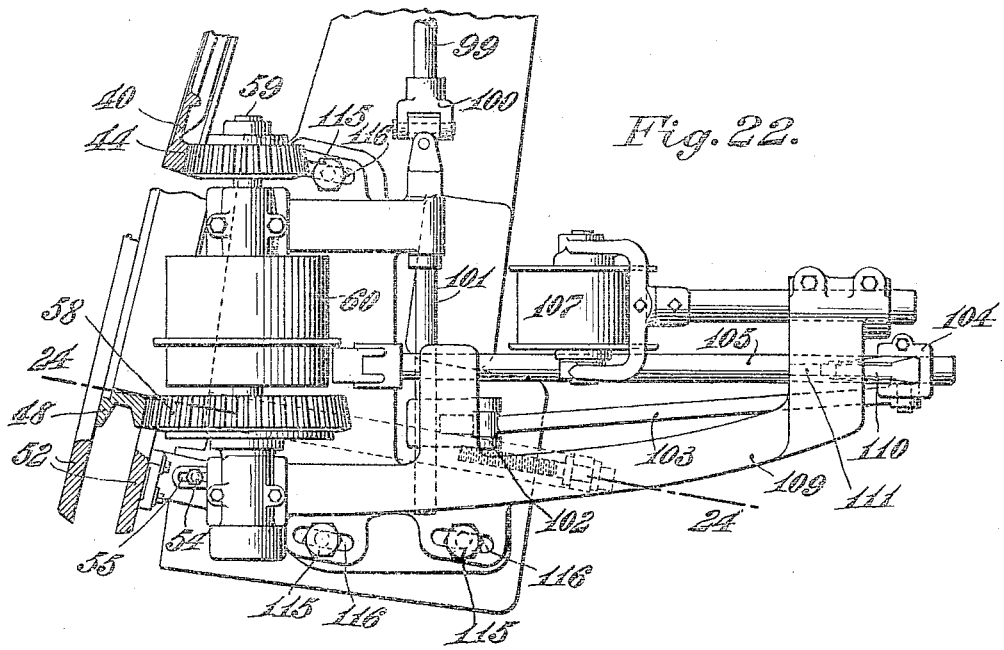
Fig. 22.
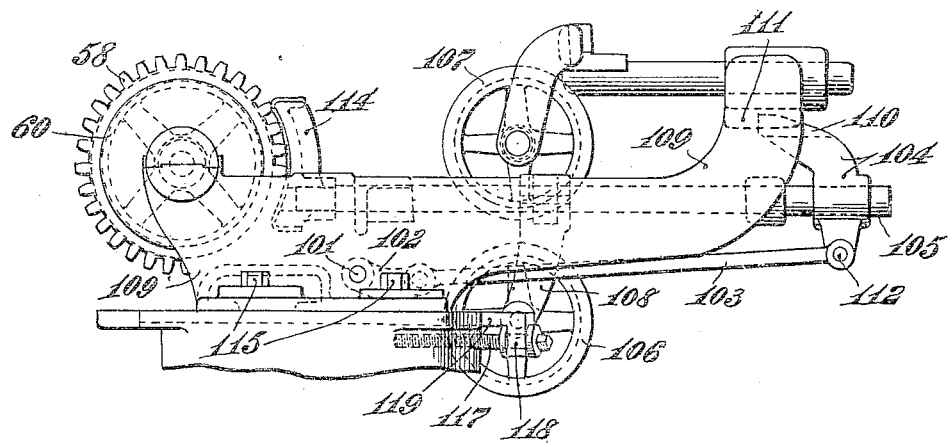
Fig. 23.
Fig. 24.
WITNESSES:
Jas. C. Wolnsmith
Mae Hofmann
INVENTOR
Howard K. King,
BY
Jno. Trousdale
ATTORNEY.

H. K. KING.
BRICK MACHINE.
APPLICATION FILED DEC. 5, 1907.

953,670.

Patented Mar. 29, 1910.
16 SHEETS—SHEET 13.

WITNESSES:
Jas. C. Wobensmith
Mae Hofmann

INVENTOR
Howard K. King,
BY
M. O. Crowdal
ATTORNEY.

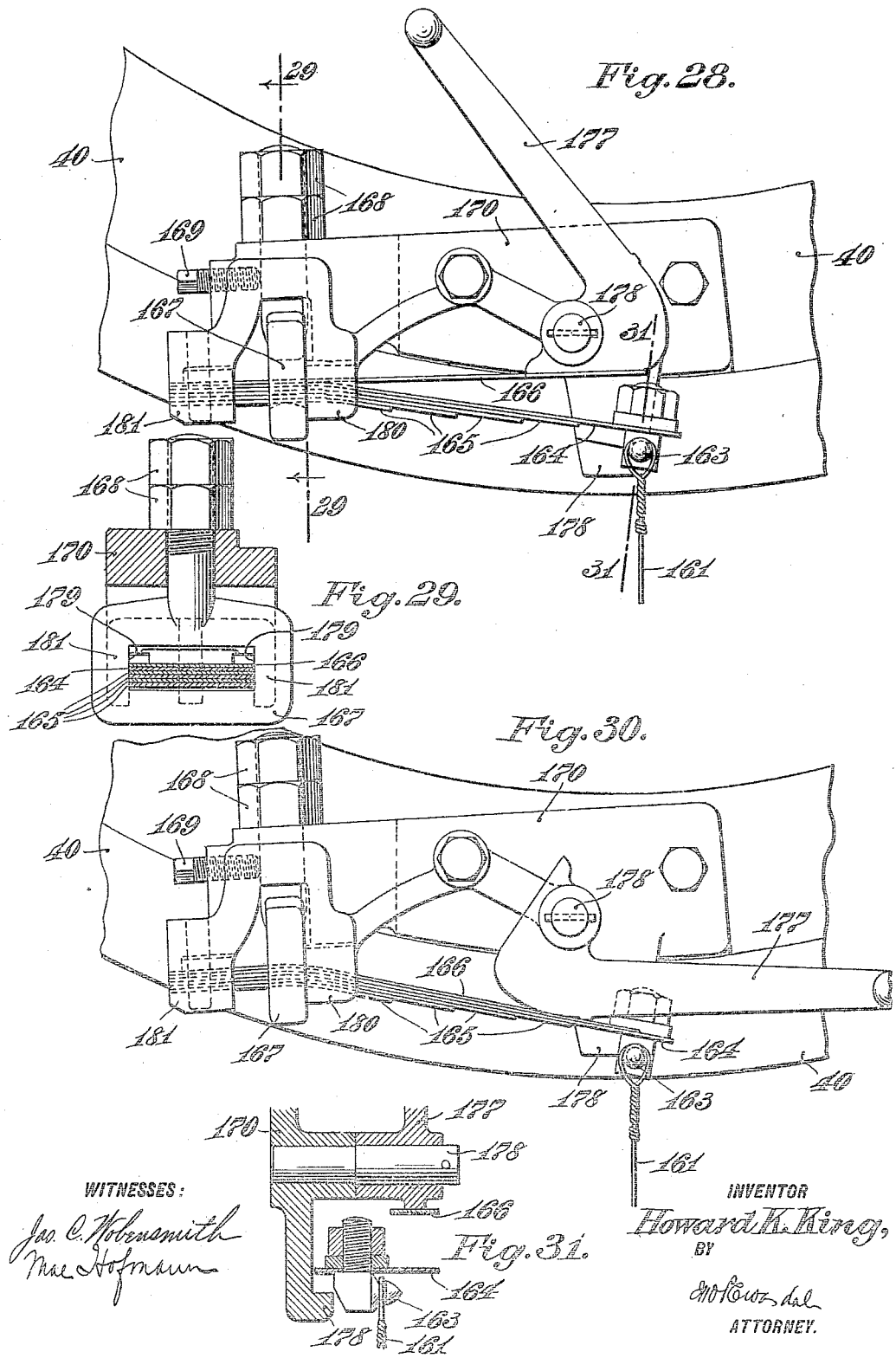

H. K. KING.
BRICK MACHINE.
APPLICATION FILED DEC. 5, 1907.

953,670.

Patented Mar. 29, 1910.
16 SHEETS—SHEET 15.

WITNESSES:
Jas. C. Wobensmith
Mae Hofmann

INVENTOR
Howard K. King,
BY
[signature]
ATTORNEY.

H. K. KING.
BRICK MACHINE.
APPLICATION FILED DEC. 5, 1907.
953,670.
Patented Mar. 29, 1910.
16 SHEETS—SHEET 16.
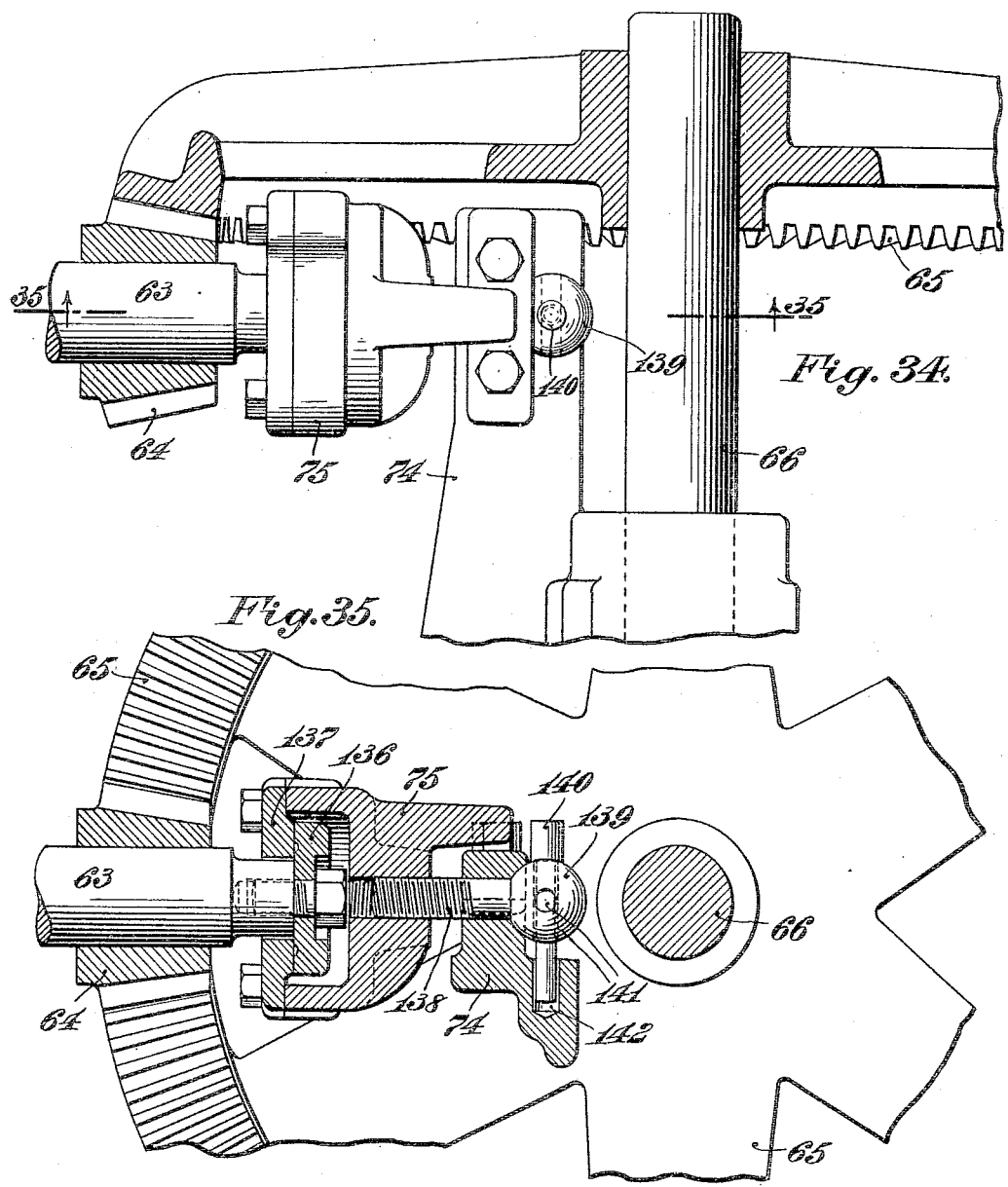
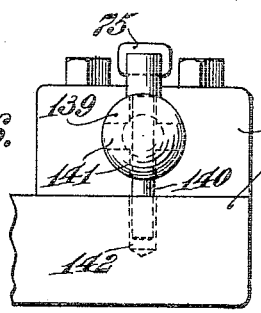
WITNESSES:
Jas. C. Wobensmith
Mae Hofmann
INVENTOR
Howard K. King,
BY
S. W. Howard, del
ATTORNEY.

UNITED STATES PATENT OFFICE.

HOWARD K. KING, OF PHILADELPHIA, PENNSYLVANIA, ASSIGNOR TO CHAMBERS BROTHERS COMPANY, A CORPORATION OF PENNSYLVANIA.

BRICK-MACHINE.

953,670.          Specification of Letters Patent.          Patented Mar. 29, 1910.

Application filed December 5, 1907. Serial No. 405,215.

*To all whom it may concern:*

Be it known that I, HOWARD K. KING, a citizen of the United States, residing at Philadelphia, in the county of Philadelphia and State of Pennsylvania, have invented a new and useful Brick-Machine, of which the following is a specification.

My invention relates to wire cut-off mechanism for brick machines.

The object of my invention is to provide improved means for supporting and moving the cut-off wires in planes at the required angle through the bar during the travel of the bar.

The invention comprises improved means for the independent adjustment of the supporting mechanism for each end of the wire and improved means for providing a positive drive to each of said independently adjustable supporting means.

My invention also comprises automatic means controlled by the travel of the bar for affecting or controlling the positive drive of said wire actuating means.

This invention comprises improvements on the mechanism described in patent to King and Chambers No. 678,259; July 9, 1901. Referring to the machine described in said Patent 678,259, it is to be noted that the outer ring, which supports one end of each wire, is actuated solely by the inner ring 16ª through the wires connecting said two rings. As has been explained in the specification of the patent, it was impossible to get an absolutely straight or right-angular cut of the bar by this mechanism without the use of a guide slit, that is without utilizing the margins of the slit for deflecting the wire from the position it would otherwise assume, and notwithstanding this it was a fact that when the wire was passing through the clay bar the resistance caused thereby resulted in the sagging or deflecting of the wire, the tendency being to deflect it at right angles to the travel of the bar, and this was due both to the yielding of the outer support of the wire and to the lag caused on the supporting ring 16. A further cause of error was the yielding or bowing of the wire. Because of this discrepancy it was impossible to get an absolutely accurate cut even by the use of the guiding margins or the margins of the slit for guiding said wire. It is to be noted that both sides or both margins of the slit had to be utilized to guide the wire, the first half on one side and the second half on the other side. By the mechanism of the present invention, I am able to absolutely dispense with the use of guiding margins and thus eliminate the elements of error above referred to. It is to be understood that the error caused by the deflection of the wire above referred to, resulted in irregular cutting of the blocks, that is to say, the bricks were not cut in planes at right angles with their other extensions, but were slightly inclined or what are known as skewed. Another feature of the structure described in said patent was that the cut-off mechanism was positively driven through the measuring pulley, supplemented by a helping belt driven from the main source of power. The tension of this helping belt was adjusted by a screw hand wheel acting on a spring lever, which served to adjust the amount of power communicated through the helping belt to the normal requirements of the traveling bar, but it is to be noted that this adjustment was not a variable or automatic adjustment, and therefore when the speed of travel of the clay bar suddenly changed, there was no automatic change in the adjustment to correspond, and thus undesirable results were likely to occur.

My present invention comprises means for overcoming this objection.

My invention also comprises details in construction mainly devised to accomplish the results above referred to.

One of the important features of the present invention consists in the fact that the inner ring and outer ring are each independently supported and adjustable, and each positively driven, so that the wire is carried through the clay bar in a plane accurately cut at right angles with its longitudinal extension.

Two important features of the present mechanism are the positive drive of both rings, and the independent adjustment of the plane of movement of each ring, so that there is a positive support for each end of the wire, which makes it possible to secure the required movement of the wire through the bar of clay, for bricks of different sizes, to secure the cut in a plane at right angles with the bar's extension.

Figure 10:
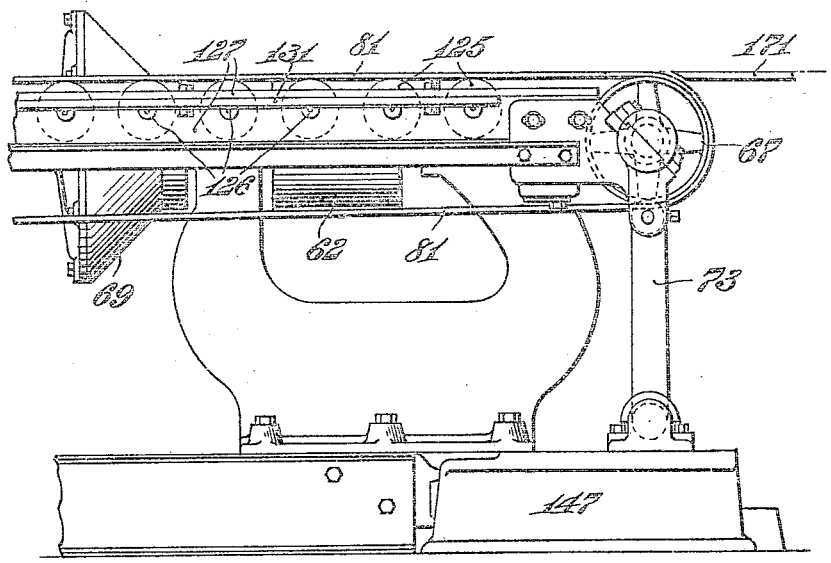
Figure 11:
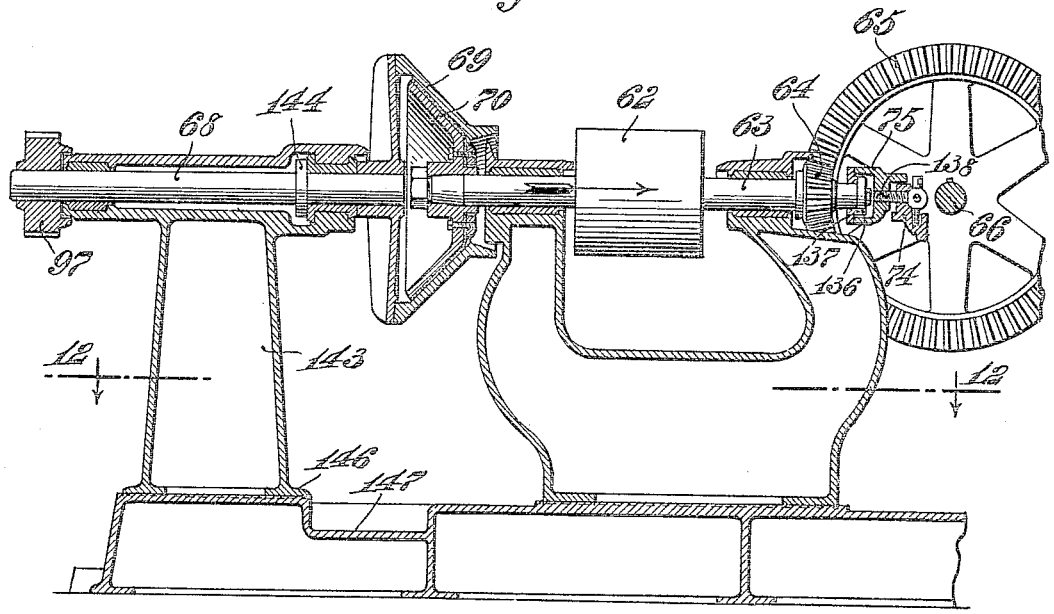
Figure 12:
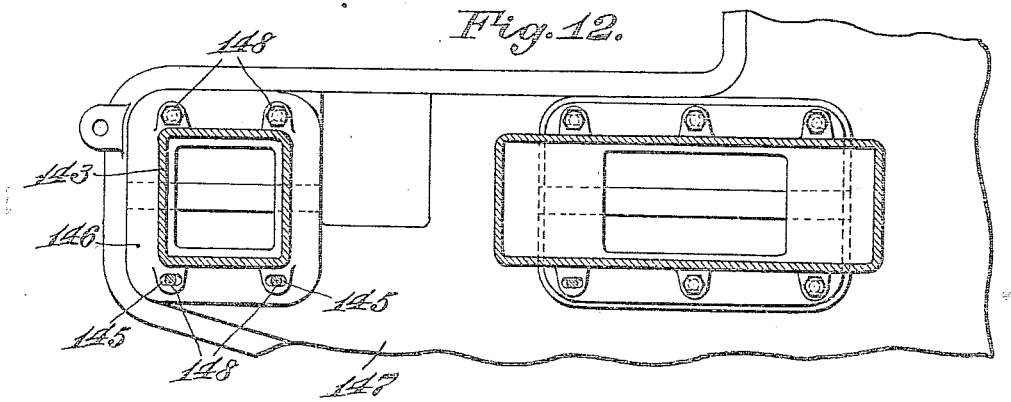
Figure 13:
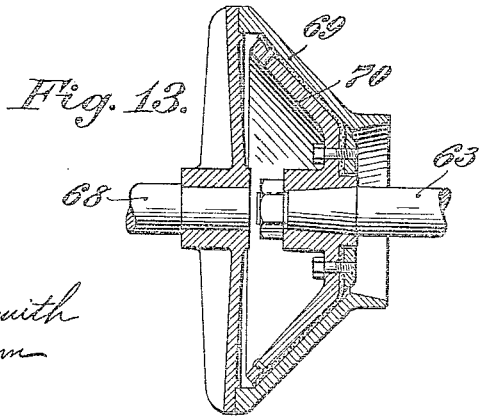
Figure 19:
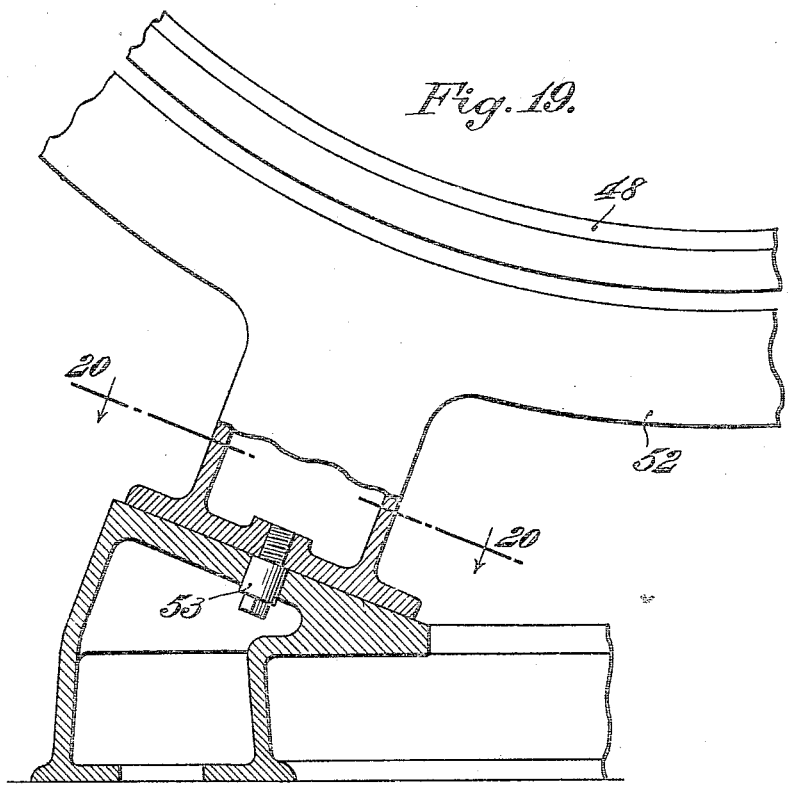
Figure 20:
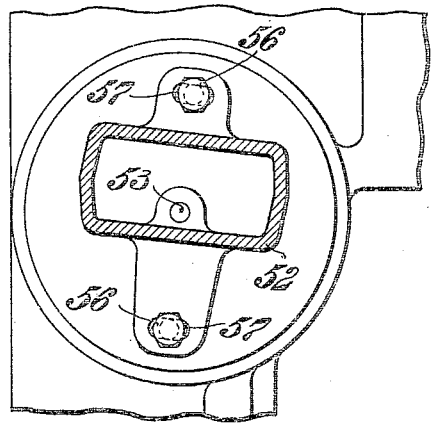
Figure 21:
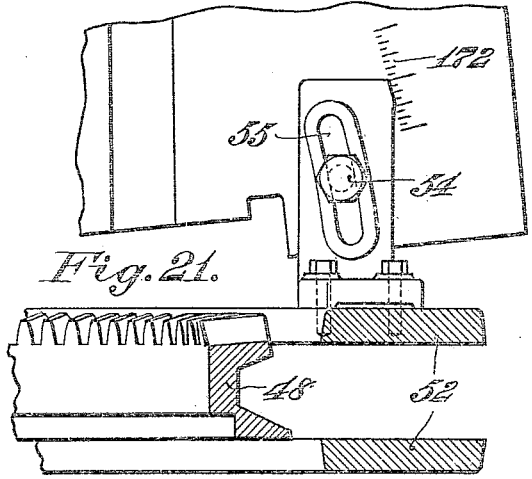
Figure 25:
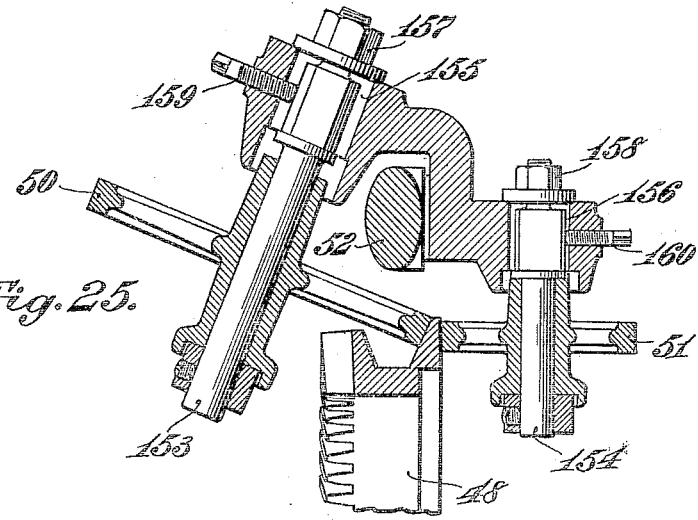
Figure 26:
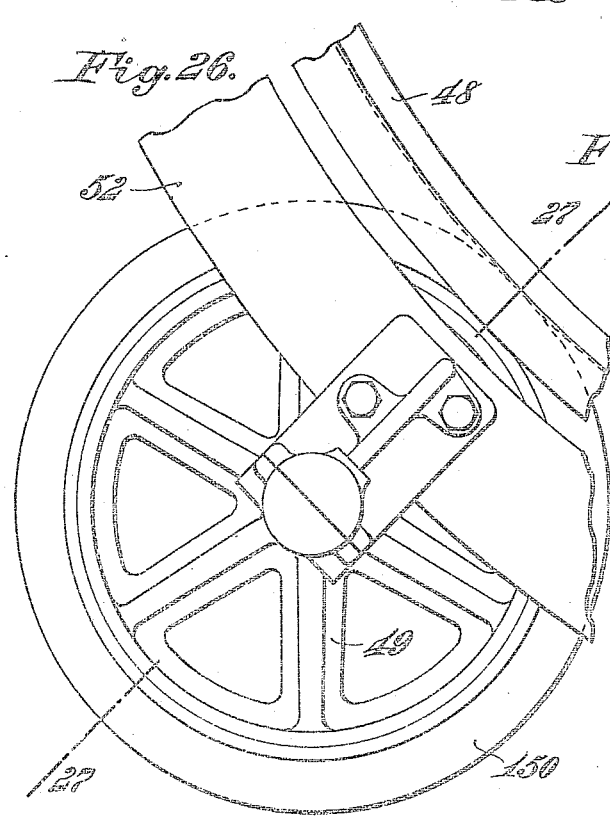
Figure 27:
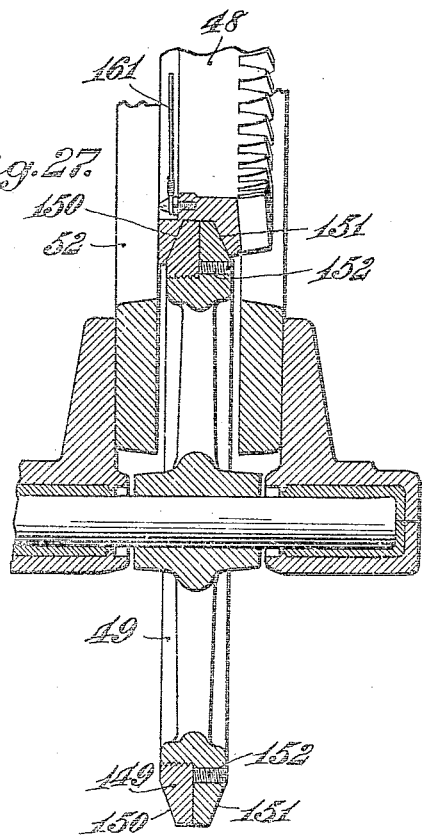
Figure 32:
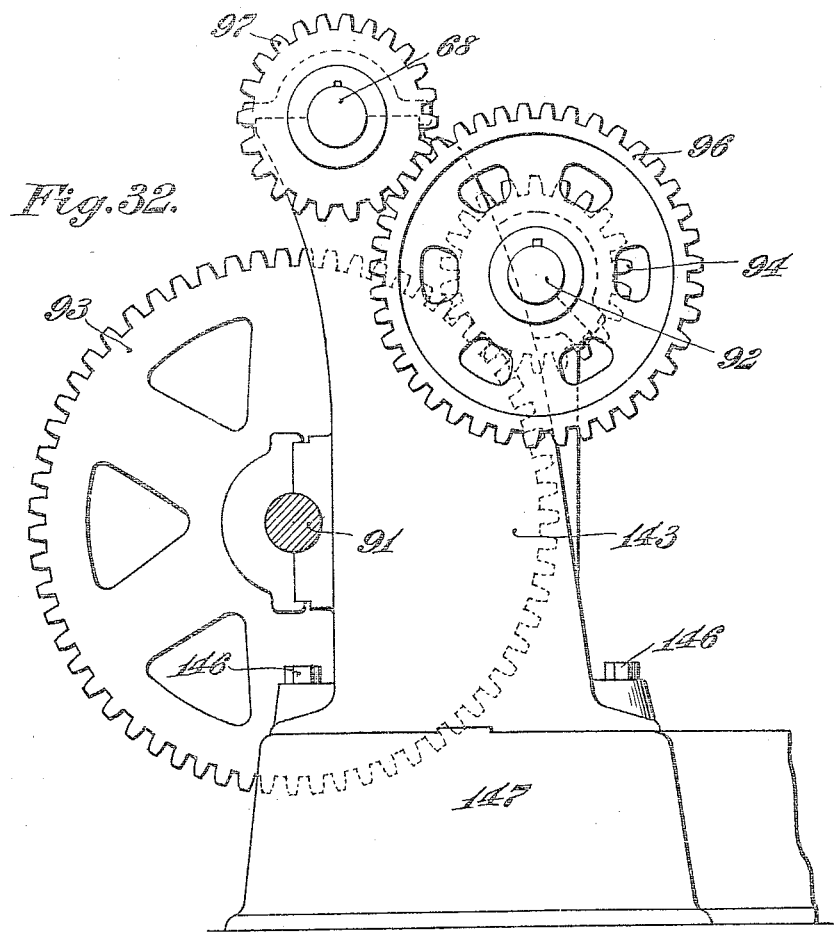
Figure 33:
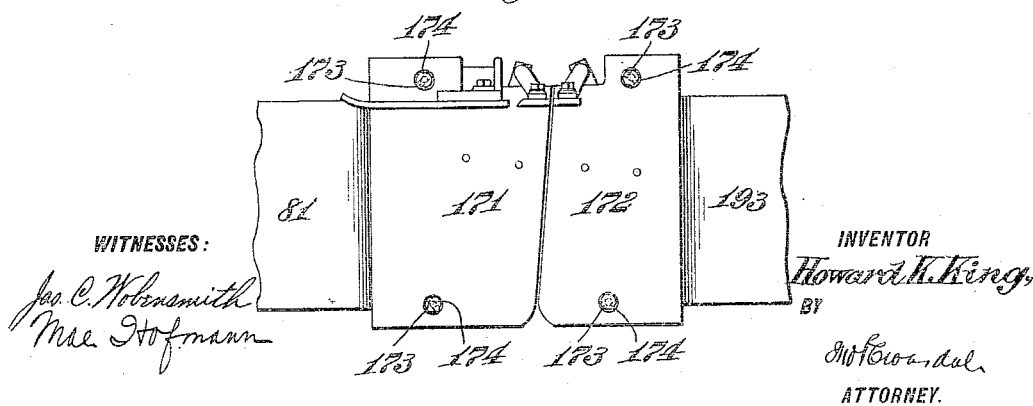

Referring to the drawings:—Figure 1 is a plan view. Fig. 2 is a sectional elevation on line 2—2 of Fig. 1. Fig. 3 is a cross section on line 3—3 of Fig. 2. Fig. 4 is a fragmentary plan view of part of the regulating frame and associated mechanism at the die end of the machine. Fig. 5 is a similar view of the other end of the frame and associated mechanism. Fig. 6 is an elevation of the structure shown in Fig. 4. Fig. 7 is a detail showing a roller and the journal boxes for supporting the same. Fig. 8 is a perspective view of a journal box. Fig. 9 is an end elevation of the regulating frame and associated mechanism at the cutting end. Fig. 10 is a side elevation of the structure shown in Fig. 9. Fig. 11 is a vertical section on line 11—11 of Fig. 5. Fig. 12 is a horizontal section on line 12—12 of Fig. 11. Fig. 13 is an enlarged section of the friction device shown in Fig. 11. Fig. 14 is a sectional elevation on line 14—14 of Figs. 4 and 6. Fig. 15 is a sectional elevation on line 15—15 of Figs. 4 and 6. Fig. 16 is a side elevation of the mechanism shown in Fig. 15. Fig. 17 is a fragmentary sectional view of the inner ring and associated mechanism on a larger scale than that shown in Fig. 3. Fig. 18 is a section on line 18—18 of Fig. 17. Fig. 19 is a fragmentary view, in part section, of the supporting means for the outer ring. Fig. 20 is a section on line 20—20 of Fig. 19. Fig. 21 is a fragmentary enlarged sectional view of the outer ring on line 3—3 of Fig. 2. Fig. 22 is a fragmentary plan view of the driving and brake mechanism for the wire supporting rings. Fig. 23 is a side elevation of the same. Fig. 24 is a section of a portion of the adjusting mechanism on line 24—24 of Fig. 22. Fig. 25 is a section on line 25—25 of Fig. 2. Fig. 26 is a side elevation of one of the lower supporting rollers. Fig. 27 is a section on line 27—27 of Fig. 26. Fig. 28 is an elevation of the spring controlled wire supporting mechanism on the inner ring in the operative position. Fig. 29 is a section on line 29—29 of Fig. 28. Fig. 30 is a similar view as that shown in Fig. 28 with the disengaging lever depressed for attaching the wire. Fig. 31 is a section on line 31—31 of Fig. 28. Fig. 32 is a section on line 32—32 of Fig. 5. Fig. 33 is a plan view of the bottom slit plates. Fig. 34 is a section on line 34—34 of Fig. 9. Fig. 35 is a section on line 35—35 of Fig. 34. Fig. 36 is a detail in elevation of the adjusting screw and lock pin shown in Fig. 35. Fig. 37 is a detail in side elevation of the wire supporting stud. Fig. 38 is a detail in plan view of same. Fig. 39 is a detail in perspective of the upper portion of the spring 76 and connection.

Similar numerals refer to similar parts throughout the several views.

As the general construction and operation of this device is similar in many respects to the device shown and described in the patent above referred to it is thought to be necessary for the most part to describe only the features in detail which constitute the improvements above referred to.

*Adjustable wire supporting means.*—Referring to the wire supporting and moving mechanism as best shown in Figs. 2 and 3, the inner wheel or wire ring 40 is supported on the shaft 41 in journal box 42 adjustably mounted on the portion 43 of the stationary framework of the machine. This wheel or wire ring 40 is provided with gear teeth for coöperation with the driving pinion 44. Said journal box 42 has a pivotal connection at 45 with the stationary frame 43, and is adjustable about said pivot within the range of movement permitted by the slots 46 through which project the fastening bolts 47. The outer ring or wheel 48, see Figs. 2 and 3, is mounted on the rollers 49 and is guided at the top between two rollers 50 and 51 as best shown in Fig. 25. These wheels 50 and 51 and also the rollers 49 are supported on a stationary ring 52 which is adjustably secured to the stationary framework. The adjustable method of connecting the ring member 52 with the stationary framework is clearly shown in Figs. 19 to 21 inclusive. Said ring 52 having a pivotal movement about pivot 53 and within the range of movement between bolt 54 and slot 55 shown in Fig. 21. A further adjustable fastening means consists in bolts 56 in slots 57. The wire ring 48 is also provided with serrations or gear teeth on its side for coöperation with the pinion 58. It will thus be seen that the supporting structure for the inner ring 40 has an adjustment about the pivot 45, while the outer ring 48 has an independent adjustment about the pivot 53. The centers of said pivots or the axes of movement of said ring supporting means, are approximately coincident or lie approximately on the same line, when projected therethrough as indicated in Fig. 3. The adjustment of inner ring 40 is indicated on the scale 171, Figs. 3 and 17, while that of the outer ring 48 on the scale 172, Figs. 3 and 21.

*Actuation of wire rings.*—It will also be seen that each wheel has a positive drive from its respective pinion, both mounted on the same shaft 59. By this means each end of each wire will be carried uniformly and positively so that no distortion or error can be caused by the resistance to its movement as it passes through the clay, and that since both rings are capable of independent adjustment it is obvious that such adjustment may be made as will insure an accurately rectangular cut of the bar without resorting to any guiding effect of the slit plates, and thus the element of error incident thereto as above described is eliminated.

The pinions 44 and 58 are mounted on shaft 59, carrying pulley 60, which is driven through belt 61 by pulley 62 on shaft 63, which is geared through pinion 64 with the gear wheel 65 on shaft 66 of the regulating pulley 67. The movement of regulating pulley 67 is normally controlled by the movement of the clay bar. The helping power for coöperating with the regulating pulley is communicated from shaft 68 from the main source of power through the outer friction cone 69 on shaft 68 and the inner cone 70 on shaft 63. The main shaft 91 of the machine drives countershaft 92 through gears 93 and 94, and shaft 68 through gears 96 and 97, see Fig. 32.

*Automatic regulation of the friction clutch.*—The efficiency of contact between the friction elements 69 and 70, which is controlled by the movement of the clay bar, will now be described as follows: The regulating frame 71 is carried by the rollers 72 at one end, see Fig. 6, and at the other end is pivotally mounted on the frame 73, see Figs. 9 and 10. Extending from the end of the regulating frame is the bracket 74, see Figs. 5 and 34 which supports the thrust box 75 secured on the end of shaft 63, see also Fig. 11; it being understood that this bracket 74 is integral with the journal box of shaft 66. The shaft 63 has a longitudinal movement through its journal boxes so that it will be evident that any movement forward or back of the regulating frame will effect the efficiency of engagement between the friction elements 69 and 70. Secured to the stationary framework of the device is the spring 76 regulated by the tension wheel 77. This tension spring 76 has an operative connection with the regulating frame through the rod 78, which is pivoted to the frame at 79 and has an engagement with the spring at 80. The action of this spring 76 is to press the frame 71 in the direction of the arrow, see Fig. 5, which through the thrust box 77 carried on bracket 74 tends to pull the shaft 63 in the direction of the arrow, see Fig. 11, and thereby maintain an efficient engagement between friction elements 69 and 70. It will thus be seen that by a nice adjustment of spring 76 the amount of help normally desired from the shaft 68 to the shaft 63 will be secured for the actuation of the wire rings 40 and 48. It is also to be noted that shaft 63 is geared through pinion 64 and gear 65 with shaft 66 of the measuring pulley 67. When the movement of the clay bar carried by the measuring belt 81 is accelerated, it tends to push the frame 71 forward and adds to the pressure exerted through spring 76 to increase the efficiency of engagement between the friction elements 69 and 70. While on the other hand, when the clay bar is retarded in its travel, the regulating frame 71 will be pulled backward in opposition to spring 76, which, through the connecting mechanisms above described, will tend to separate and thereby diminish the efficiency of engagement between the friction elements 69 and 70. In this way is secured a highly responsive automatic adjustment, controlled by the travel of the clay bar, for regulating the movement of the cutting elements to correspond with the movement of the said clay bar. Any variation tending to exist between the speed of travel of the bar of clay and of the regulating belt is immediately transmitted through the regulating table to the friction device, whereby said variation is neutralized and the regulating belt and the cutting mechanism are at all times positively driven at the same speed with that of the bar of clay.

It is to be understood that shaft 68 is always driven at a speed greater than that of shaft 63, that is, at speed greater than shaft 63 will ever be required to attain. It thus follows that the engagement between the elements 69 and 70 is always a varying slipping engagement and by the automatic adjustment between said elements 69 and 70 as above described, the movement of the cut-off mechanism and the movement of the regulating belt are always maintained relative to the varying speed of travel of the bar, notwithstanding the fact that the speed of movement of the main driving shaft 91 is constant.

*Throw-out and brake for cut-off mechanism.*—In order to interrupt the operation of the cut-off mechanism, without stopping the movement of the clay bar, since it is sometimes necessary to replace a broken wire on the cut-off rings, and it is undesirable to interrupt the movement of the clay through the machine for reasons well known in the art, I provide the following mechanism: As already pointed out, power is communicated from pulley 62 to shaft 59 through belt 61 running over a pair of idler pulleys 106 and 107, see Fig. 1. Pulley 106 is mounted on a bracket 108 carried by the shaft 105 which is slidably mounted on the bracket 109 which is adjustably connected with the stationary framework of the machine, see Figs. 22, 23 and 24. On one end of shaft 105 is secured the member 104 having one end 110 projecting into and adapted to move in the channel 111. This is to prevent the turning of the shaft while permitting its longitudinal movement. At the lower side of member 104 is pivoted at 112 the connecting rod 103, which is secured at its other end to the crank 102 on shaft 101. To the other end of shaft 105 is secured the brake shoe 114 which is adapted to coöperate with pulley 60. Shaft 101 is connected by the universal joint 100 with the shaft 99 which extends across the machine and is provided at its other end with the hand lever 98, see Fig. 1. By shifting lever 98 in one direction the pulley 106 is moved toward pulley 60, thus slacking the belt thereon and at the same time brake 114 coöperates with the said pulley 60 to stop its rotation. By moving the lever in the other direction the pulley is returned to the normal position and the brake is moved away from contact with pulley 60.

*Adjustment of pinions.*—As already stated the wire rings 40 and 48 are independently adjustable, the one about center 45, the other about the center 53; the said centers being on a line extending through the said axes. The gear wheels 44 and 58 are journaled in the framework or bracket 109 which is secured on the stationary framework by the fastening bolts 115 projecting through slots 116. The movement of this bracket 109 to bring the gears or pinions 44 and 58 into proper relations with the gear teeth on the wire rings 40 and 48, after the same have been properly adjusted, is accomplished by the adjusting screw 117, see Fig. 24, threaded into the stationary framework and engaging with the lug 118 of guide tongue 119, which is secured to the underside of bracket 109.

*Tension control of regulating belt.*—The means for securing the necessary tightening or tension of the regulating belt may be described as follows: The frame 120 is slidably mounted on the regulating frame 71 as shown in Fig. 6. On the die end of this sliding frame 120 is journaled pulley 121 around which passes the regulating belt 81. This frame 120 is engaged with the screw 122 threaded into the member 123 which is secured to the regulating frame 71 so that the distance between pulley 121 and the regulating pulley 67, may be increased or diminished by turning the screw wheel 124 in one direction or the other. The intermediate portion of the regulating belt is supported as usual upon the series of supporting rollers 125.

*Construction of roller journals.*—The rollers 125 for supporting the extension of the regulating belt 81 between pulley 121 and the regulating pulley 67 are journaled in the journal boxes 126 which are loosely seated in the T-irons 127 which are connected with the sides of the regulating frame 71. These journal boxes 126 are adapted to aline themselves with the journals 130 of said rollers 125 and are then loosely secured in place by the bars 131. By this simple construction is secured the automatic alinement of the journal boxes with the journals.

*Vertical adjustment of regulating frame.*—The vertical adjustment of the die end of the regulating frame is secured as folows: The rollers 72 upon which this end of frame 71 rests, are journaled on uprights from frame 132. This frame 132 has a tongue adapted to project into a vertical channel or groove in the stationary member 133. A screw 134 projecting upwardly through the base of the machine is adapted to engage the underside of member 132, to secure any desired vertical adjustment thereof, while the bolt 135 is adapted to lock the members 132 and 133 together when such adjustment is secured.

*Adjustable means for maintaining the proper relation between gears 64 and 65.*— Referring to Figs. 11 and 35, it is to be noted that shaft 63 is adapted to have a longitudinal movement in its journal boxes, and that it is normally maintained by the action of the spring 76 through the regulating frame 71 and thrust box 75 in position to maintain engagement between friction elements 69 and 70. It is also to be noted that the shaft 63 is to be maintained in such position as to preserve the proper relation between gears 64 and 65. It will be obvious, from an inspection of Fig. 35, that the element 136 at the end of shaft 63 has a bearing against the plate 137 of the thrust box 75, and that as the friction surfaces of these two members wear, it is necessary to take up such wear to maintain the gears 64 and 65 in the desired relative position. For this purpose I secure the thrust box 75 to the bracket member 74 by the screw 138 provided with a spherical head 139. By turning this screw in one direction or the other the required adjustment between thrust box 75 and bracket 74 is secured, and consequently the desired relative positions of gears 64 and 65 are secured. The pin 140 is adapted to project through apertures 141 in said head, there being two transverse apertures, and said pin is adapted to coöperate with the aperture 142 in bracket member 74 normally to maintain said screw 138 in any desired position of adjustment.

*Adjustment of journal bearing for shaft 68.*—The proper adjustment of the journal bearing member carrying the shaft 68 of the thrust collar 144, with respect to the other operative parts of the machine is secured by providing the slots 145 in the base 146 of the journal box member 143, so that a certain amount of play is permitted therein, in adjusting said member 143 to the base 147 of the machine by the fastening bolts 148. By this means wear between elements 69 and 70 may be taken up and the elements 69 and 70 may assume the proper normal relative position, with the pivoted frame 73, supporting the front end of the regulating frame 71, in the strictly upright position.

*Construction of rolls 49.*—Rolls 49 coöperate with rolls 50 and 51 in supporting the wire ring 48. Each roll 49 is provided with a rim having a removable portion 149, which is adapted to be threaded onto the said roll 49, and has a beveled edge 150 corresponding to the beveled edge 151 which is integral with said roll 49. It will thus be noted that by turning the portion 149 either to the right or to the left the distance between surfaces 150 and 151 may be diminished or increased. In this way wear between said surfaces and the corresponding groove in ring member 48 may be taken up and a close fit between said roll 49 and ring 48 is always maintained. The set-screw 152 is designed to lock member 149 with roll 49 in the required position of adjustment.

*Adjustment of the upper supporting rolls.*—The required adjustment between rolls 50 and 51 and ring 48 is secured by mounting these rolls on the shafts 153 and 154 respectively, which in turn, are bolted in slots 155 and 156 of the supporting frame 52. The nuts 157 and 158 coöperate with the set-screws 159 and 160 respectively in securing such adjustment.

*Improved means for attaching and supporting the wire.*—The wires 161 are secured between the rings 40 and 48 in the following way: They are provided with loops at each end. The loops pass over studs 162 projecting from the inner margin of ring 48, see Fig. 3. The loop at the other end of the wire 161 is adapted to engage with the stud 163 which is carried by the leaf spring 164. This spring 164 which is reinforced by a plurality of supplemental leaf springs 165 serves to exert the required tension on the wire 161. These springs 164 and 165 together with a spring 166 are all held together in the bracket 170 carried by wheel or wire ring 40. The required adjustment of these springs is maintained by the stirrup 167, acting between two points of contact of the spring with the bracket, one of said points of contact being removed somewhat from the stirrup, so that the tension on the composite spring may be varied as required by raising or lowering the stirrup 167 by means of the nuts 168 as will be readily understood by an inspection of Fig. 28. The set-screw 169 provides further means for maintaining the stirrup member in the required position. The arm 177 is pivoted to the bracket 170 at 178 and is normally maintained in the position shown in Fig. 28, by the spring 166. When it is desired to depress the stud 163, in order to secure the loop of a wire thereon, the lever is brought down into a position shown in Fig. 30, which carries the spring 166 into engagement with spring 164, which causes the depression of said spring 164 which carries the stud 163. When the loop has been placed over the stud 163 the lever 177 is returned to the position shown in Fig. 28, and the stud 163 is carried upwardly by the springs 164 and 165 to maintain the wire 161 under spring tension. In order to protect the springs 164 and 165 from being broken by undue strain, for instance, in case the wire 161 meets an unusual obstruction, the lug or stop 178 is provided, which projects from the lower extension of bracket 170. This limits the downward movement of spring 164 and thus prevents it from being broken. The springs 164 and 165 are guided from lateral movement by a nice fit against the sides 179 of lugs 180 and 181 of the bracket 170. In other words the vertical movement of springs 164 and 165 is strictly controlled by the engagement of both sides of said springs with the sides of the lugs 180 and 181 of bracket 170.

*Construction of wire supporting studs or hooks.*—As already described, the wire rings are adjusted to travel in different planes, that is, in planes at different angles or inclinations, with the direction of movement of the bar of clay, and the wires are always maintained and actuated to travel so as to cut at right angles therewith. The result of this is that there is a constant oscillation or relative movement of one end of the wire from one side to the other of the other end. This results in a swinging or angular movement of the wires on their respective studs or hooks 162 as indicated in solid and dotted lines in Fig. 37 Sheet 3. To permit this free angular movement it is necessary to have the stud or hooks 162 shaped with receding shoulders as clearly shown in said Fig. 37, so that the wire practically hangs on one side of the stud, and has a free pivotal movement against said side that is toward and away from the head and base of the stud, or toward and away from said receding shoulders. It is to be noted that the loop of the wire, as shown in Fig. 38, is large enough to permit it to clear a large portion of the bevel of this pin in either direction, to permit of such free movement.

*Relation of slit plates and wire.*—Referring to Fig. 33 the slit plates 171 and 172 have a slight adjustable movement, permitted by the slots 173 which are all in the arcs of concentric circles, the center of which is about the middle of the slit. These slots are sufficiently large to permit a slight lateral movement about the fastening bolts 174. It is to be noted that in view of the method of supporting and moving the cutting wires, any deflection or bowing thereof due to the resistance exerted by the clay, is in the direction opposite to that of the line of travel of the wire. It is to be remembered that the travel of the wire is always in such direction as to secure a cut in a plane at right angles with the longitudinal extension of the bar. It will also be remembered that the bar is traveling at the same time, and that this right angular cut must be a resultant of the combined movements of the wire and the clay bar, and that consequently the movement of the wire is not strictly at right angles with the line of travel of the clay bar, but the deflection due to the resistance of the wire cutting through the clay is strictly in the plane of its cut, that is, at right angles to the direction of travel of the bar. It results that if the wire is adjusted to lie normally against the edge of member 171 and consequently away from the edge of member 172, any deflection or bowing of the wire, due to the resistance of the clay bar, will tend to draw it slightly away from the edge of 171, that is to say if the direction of deflection is at right angles with the travel of the bar, it is obvious that any movement in such direction will be inclined to the direction of the slit, which will tend to move it diagonally across said slit, toward 172, so that there will be no distortion of the wire by forcing it in contact with the edge of either slit plate.

*Actuation of carry-off belt.*—The carry-off belt is driven from the main shaft 91 through the bevel gears 175 and 176 in the usual way well known in the art.

*Construction and support of slip plate.*—Referring to Patent No. 678,259 it will be noted that the slip plate at the die end of the machine is composed of two parts 11 and 12, see Fig. 17, having adjacent margins diagonal with the line of travel of the clay bar. The object of this construction is to permit the pivotal movement of plate 11 which is supported by the die member 3 when the same is thrown to the open position. The plate 12 is rigidly secured to the measuring belt frame of the machine. In the present invention however, I am able to employ a single slip plate 182 which is adapted to extend close to the end of the regulating belt 81 around pulley 121 and yet swing with the supporting structure either of the die or the sand box, to which it is attached without interfering or being obstructed in its movement by said belt. I accomplish this by the following mechanism: The plate 182 is provided with the trunnions 183 see Fig. 6, and a centrally disposed downwardly projecting extension 184 provided with the set-screw 185. The trunnions 183 are adapted to seat in the recesses 186 of the bracket member 187 which has a vertically movable tongue and grooved engagement with member 188, which is integral with the sand box or die of the machine. The set-screw 189 operating in bracket 188 and engaging with the lower end of bracket member 187 secures the desired vertical adjustment of the plate. The set-screw 185 at the lower end of extension 184 which is adapted to engage with member 187 secures the horizontal adjustment of plate 182. The engagement of set-screw 185 with member 187 is maintained simply by the gravity actuation of plate member 182. When the plate is swung around with the die member or sand box it is permitted to oscillate or be raised to clear the regulating belt 81 by reason of the trunnion engagement with bracket member 187.

*Side guide plate.*—Referring again to Patent No. 678,259, it is to be noted that means are shown and described for shifting the die end of the regulating belt to take up any unevenness of the bar of clay as it comes out irregularly or in a direction not strictly in line of travel of the belt. I now overcome this objection without moving the regulating belt at all by providing the guide plate 190 on the side of the slip plate 182. This guide plate is detachably secured by bolts on the underside of the supporting structure of slip plate 182, and may be moved from one side to the other of said slip plate as desired. This does away with the unnecessary complication of means for securing the lateral adjustment of the regulating belt.

*Arbitrary control of friction clutch.*—In order, arbitrarily to control the friction clutch, independently of the actuation of the regulating frame by the movement of the clay bar, for starting the machine, I provide the lever 194 pivoted at 195 to the stationary framework of the machine, and having slot and pivot engagement at 196 with the regulating frame 71. The operator by moving the lever in one direction or the other may move the regulating frame accordingly, and thereby, at will, increase or decrease the efficiency of engagement between the friction elements 69 and 70.

What I claim is:—

1. In a brick machine, the combination of a cut off wire, a movable supporting member for each end of the wire, means for independently adjusting each movable member and means for the positive actuation of each movable member independently of the wire connected therewith.

2. In a brick machine, the combination of a cut off wire, a pair of rotatable wire rings, each independently supported, means for adjusting the supporting means of each ring to change its plane of rotation.

3. In a brick machine, the combination of a cut off wire, a pair of rotatable wire rings, each independently supported, means for adjusting the supporting means of each ring to change its plane of rotation, and gear means for positively actuating each ring.

4. In a brick machine, the combination of a cut off wire, a pair of rotatable wire rings for supporting the same, a supporting shaft for one ring and a journal box therefor, having a pivotal adjustment with respect to the stationary framework of the machine.

5. In a brick machine, the combination of a cut off wire, a pair of rotatable wire rings for supporting the same, a plurality of supporting rollers for one wire ring and a supporting frame for the rollers having a pivotal adjustment with respect to the stationary framework of the machine.

6. In a brick machine, the combination of a cut off wire, a pair of rotatable wire rings for supporting the same, having axes of adjustment in approximate alinement.

7. In a brick machine, the combination of a cut off wire, a pair of rotatable wire rings for supporting the same, means for independently adjusting each ring with respect to its plane of rotation, driving gears for said rings and means for adjusting the same to correspond with the adjustment of the rings.

8. In a brick machine, the combination of a cut off wire, a pair of rotatable wire rings for supporting the same, a shaft bearing and support for one ring, a journal for said shaft having a slot and fastening bolt adjustable connection with the stationary framework of the machine.

9. In a brick machine, the combination of a cut off wire, a pair of rotatable wire rings therefor, supporting means for one of said wire rings comprising a plurality of rollers journaled in a framework having adjustable connection with the stationary framework of the machine, said rollers also having adjustable connection with its supporting frame for the purpose of taking up wear between the rollers and the rotating ring.

10. In a brick machine, wire supporting and moving means, operating means therefor, including a friction clutch comprising two rotating elements in frictional engagement, and means for controlling the efficiency of engagement of said rotating elements including a reciprocating regulating frame.

11. In a brick machine, the combination of a cutting device, means for operating the same, including a friction clutch comprising two rotating elements in frictional engagement, and means for controlling the efficiency of said frictional engagement, including a reciprocating regulating frame and connecting mechanism.

12. In a brick machine, the combination of a cutting device, means for operating the same, including a friction clutch comprising two rotating elements in frictional engagement, and means for controlling the efficiency of said frictional engagement, including a spring controlled reciprocating regulating frame and connecting mechanism.

13. In a brick machine, the combination of a cut off wire, a pair of rotatable wire rings for supporting the same, means for the independent adjustment of said rings with respect to their planes of rotation whereby the rings will be rotated to carry the opposite ends of the wire backward and forward across the middle thereof.

14. In a brick machine, the combination of a cut off wire, a pair of rotatable wire rings therefor, a spring supported stud on one ring for engaging the loop at the end of the wire, and an arm attached to the ring and projecting into the path of movement of the spring, forming a stop for limiting the spring movement of the free end of the spring, to prevent the breaking of the same.

15. In a brick machine, the combination of a cutting device, means for operating the same, including a friction clutch comprising two rotating elements in frictional engagement, and means for controlling the efficiency of said frictional engagement, including a spring controlled reciprocating regulating frame and connecting mechanism, and means for adjusting the tension of the spring.

16. In a brick machine, the combination of a cutting device, means for operating same, including a friction clutch, comprising two rotating elements in frictional engagement, means for controlling the efficiency of said frictional engagement, including a regulating belt, a movably supported regulating frame therefor, and connecting mechanism between the said frame and clutch.

17. In a brick machine, the combination of a regulating belt, a slip plate between the die end of the machine and the regulating belt, said plate provided with the horizontally extending pivots or trunnions, and recessed lugs connected with the die portion of the machine for receiving the trunnions.

18. In a brick machine, the combination of a regulating belt, a slip plate between the die end of the machine and the belt, a bracket connected with the die end of the machine and trunnions connected with the slip plate for engaging with the bracket for the purpose specified, and screw means for the vertical adjustment of the bracket and adjustable means for limiting the gravity actuating trunnion movement of the plate.

19. In a brick machine, the combination, in operative relationship, of a cutting device, a friction clutch comprising two rotating elements in frictional engagement, a regulating belt and measuring pulley operated thereby and a movable regulating frame connected directly with one clutch element, whereby automatic control of the cutting device actuation is secured highly responsive to variations in speed of travel of the clay bar.

20. In a brick machine, the combination of a pair of plates or members forming a slit between its margin in a line inclined to the line of travel of the clay bar, a cut-off wire adapted to travel through said slit in cutting the bar, means for supporting and operating the wire so that the wire shall normally lie on the side of the slit from which the clay bar comes, and so that the bow of the wire, due to the resistance of the clay, shall be diagonal across the slit but without encountering either margin thereof.

21. In a brick machine, the combination, with means for extruding and moving a bar of clay, including a die and a measuring belt, of a side guide near the die end of the belt, and means for adjustably securing said guide at the required position, either to the right, or to the left of the clay bar, so as to engage the clay bar and correct any lack of alinement of the clay bar with the measuring belt, due to inaccuracies in formation or adjustment of the die.

22. In a brick machine, the combination, in operative relationship, of a cutting device, a friction clutch comprising two rotating elements in frictional engagement, a regulating belt and measuring pulley operated thereby, a movable regulating frame, and mechanism whereby the movement of the regulating frame controls the efficiency of said frictional engagement.

23. In a brick machine, the combination of a cut-off wire, means for actuating the same, means for arbitrarily interrupting said actuation, without interfering with other operations of the machine, including a belt between the operative parts, a tension pulley operating thereon, a brake adapted to coöperate with a rotating element, and hand-operated means for moving the tension pulley and brake.

24. In a brick machine, the combination of a cut-off wire, a pair of rotatable rings for supporting the same, means for independently adjusting a ring with respect to its plane of rotation, and a scale for indicating the adjustment, having relation to the distance between successive cuts of the clay bar.

25. In a brick machine, the combination of a cutting device, operating means therefor, including a friction clutch having one element movable toward and away from the other, to vary the efficiency of engagement therebetween, a movable regulating frame and connections whereby the said movement of the friction element corresponds with that of the frame.

26. In a brick machine, the combination of a cutting device, operating means therefor, including a friction clutch comprising rotating elements in frictional engagement, one element movable toward and away from the other, to vary the efficiency of engagement therebetween, a measuring pulley, a movable regulating frame and connections whereby the said movement of the friction element corresponds with that of the frame.

27. In a brick machine, the combination of a rotating cutting element, operating means therefor, including a variable friction clutch comprising rotating elements in frictional engagement, a regulating frame movably mounted and adapted to reciprocate in response to fluctuations in rate of travel of the clay bar, and connecting means between the regulating frame and a friction element to move said element along its axis, to cause a variation in clutch efficiency corresponding to said reciprocating movement.

28. In a brick machine, the combination of a cut-off wire, means for actuating same, including a friction clutch comprising rotating elements in frictional engagement, means for adjusting the normal efficiency of said frictional engagement, a movable regulating frame, controlled by the clay bar, for varying said efficiency.

29. In a brick machine, the combination of a cut-off wire, means for actuating same, including a friction clutch comprising rotating elements in frictional engagement, means for adjusting the normal efficiency of said friction engagement, a movable regulating frame controlled by the clay bar for varying said efficiency, a tongue and grooved movable support for one end of the frame and a screw coöperating therewith for vertical adjustment thereof.

30. In a brick machine, the combination of a cut-off wire, a pair of rotatable wire rings, each independently supported, a plurality of supporting rollers for one ring, one or more of said rollers, each provided with a split rim and means for separating the two parts to take up wear and maintain a fit between said rollers and the said supported ring.

31. In a brick machine, the combination of a cut-off wire, a pair of rotatable rings therefor, each independently supported, a plurality of supporting rollers for one ring including two coöperating rollers for embracing the rim of said ring, and adjustable means for securing these rollers to maintain a close fit with the ring.

32. In a brick machine, the combination of a cut-off wire, rotatable rings therefor being independently supported, and studs for securing the wire to the rings having receding shoulders to permit a swinging movement of the wire thereon toward and away from said shoulders.

33. In a brick machine, the combination of a cut-off wire, rotatable rings therefor, being independently supported, and studs for securing the wire to the rings having receding shoulders to permit a swinging movement of the wire thereon, and the wire having comparatively large loops at the ends thereof to permit free movement of the loop on the stud toward and away from said shoulders.

34. The combination with a brick cutting machine, of a cutting wheel movable in a plane forming an oblique angle with the cutting surface and having cutting wires the outer ends of which are attached to the wheel in one plane, while the inner ends of the wires are attached to the wheel in another plane.

35. The combination with a brick cutting machine, of a rotary cutting wheel forming an oblique angle relatively to the cutting surface and having cutting wires attached, with their outer ends, in a plane corresponding to the cutting angle described by the said outer ends and attached, with their inner ends, in a plane corresponding to the cutting angle described by the said inner ends.

36. The combination with a brick cutting machine, of a rotary shaft forming an oblique angle with the cutting surface, a disk attached to the said shaft, an outer ring placed concentrically with the said disk, cutting wires extending radially between the disk and the ring, and means for deflecting the plane of the ring relatively to the plane of the disk.

37. The combination with a brick cutting machine, of a rotary shaft forming an oblique angle with the cutting surface, a disk attached to the said shaft, an outer ring placed concentrically with the said disk, cutting wires extending radially between the disk and the ring, and a roller journaled in the frame of the machine and bearing on the said ring in such a manner as to deflect the plane of the said ring relatively to the plane of the disk.

HOWARD K. KING.

Witnesses:
MAE HOFMANN,
EUGENE ZIEGLER.